United States Patent Office 3,523,097
Patented Aug. 4, 1970

3,523,097
ADHESIVE COMPOSITION COMPRISING A MONOMERIC ESTER OF METHYLENE-MALONIC ACID
Harry W. Coover, Jr., and Newton H. Shearer, Jr., Kingsport, Tenn., assignors to Eastman Kodak Company, Rochester, N.Y., a corporation of New Jersey
No Drawing. Continuation-in-part of application Ser. No. 63,463, Oct. 19, 1960. This application Mar. 31, 1964, Ser. No. 356,031
Int. Cl. C08f 45/00, 45/50, 3/50
U.S. Cl. 260—30.6
9 Claims

ABSTRACT OF THE DISCLOSURE

An adhesive composition comprising a monomeric ester of methylenemalonic acid and an acidic polymerization inhibitor, a polymeric thickener and/or a plasticizer are useful for bonding together a wide variety of materials.

---

This application is a continuation-in-part of our copending applications Ser. No. 63,463, filed Oct. 19, 1960, now abandoned and Ser. No. 223,241, filed Sept. 12, 1962, issued on Dec. 7, 1965, as U.S. Pat. 3,221,745.

The present invention relates to methylenemalonate adhesive compositions and to novel composite bonded articles comprising at least two elements bonded together with a polymeric methylenemalonate composition.

It is an object of this invention to provide new composite bonded articles.

Another object is to provide new bonded laminates having a polymeric bond between the laminates.

Another object is to provide novel composite articles bonded together with a methylenemalonate polymer formed in situ.

Still another object is to provide novel composite articles comprising at least two elements such as woods, metals, ceramics, rubber, plastics, textiles and the like adhered firmly together.

It is likewise an object to provide novel adhesive compositions that rapidly solidify when in thin films.

These and other objects are attained by means of this invention as described hereinafter with particular reference to certain preferred embodiments.

The present invention concerns composite article's comprising at least two elements bonded together by an adhesive layer formed by the polymerization in situ of a monomeric ester of methylenemalonic acid having the formula

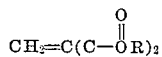

wherein R is an alkyl radical having 1 to 8 carbon atoms.

The monomeric esters of methylenemalonic acid can be prepared by methods disclosed in the literature. However our preferred method of preparation is a novel modification of the method described in Organic Synthesis, vol. 38, pages 22–25 (John Wiley and Sons, Inc., New York, 1958). Our modification of the procedure produces monomeric methylenemalonates of a quality that has not previously been reported.

In our preferred method the monomeric esters are prepared by hydrogenating the olefinic bond of a dialkyl alkoxymethylenemalonate and pyrolyzing the reaction product. The reactions can be represented by the following equations:

(1) 

(2) 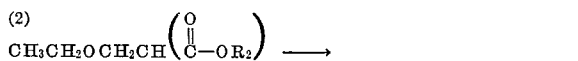

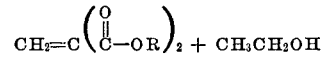

Suitable hydrogenation catalysts for Reaction 1 include Raney nickel, palladium on an alumina support, and other hydrogenation catalysts adapted to hydrogenate selectively the olefinic double bonds of unsaturated carbonyl compounds rather than the carbonyl double bonds. In our improved method the pyrolysis Reaction 2 is effected in the presence of a polymerization inhibitor, such as phosphorous pentoxide, to inhibit polymerization of the unsaturated monomer and the pyrolysis product is vacuum distilled at a low temperature to prevent contamination of the monomer with pyrolytic products that commonly result from high temperature distillation.

The important differences between our improved method of preparation and the method of the Organic Synthesis citation include the use of a polymerization inhibitor in the pyrolysis step and the use of low pressure for distilling the pyrolysis product. By the use of our improved method, and particularly by the use of a polymerization inhibitor in the pyrolysis step, we obtain the methylenemalonate monomers in very high purity. The high purity methylenemalonate monomers are excellent adhesives. They polymerize and form firm bonds in situ rapidly, usually within seconds.

The ester of methylenemalonic acid is applied to the article being bonded as a thin film in a monomeric form. This monomeric ester has substantial stability while in bulk form but rapidly polymerizes when spread in a thin film between the elements to be bonded, and hence, the elements being bonded are immediately brought together in the position to be bonded after the subject monomer is spread therebetween. Typical monomeric esters that can be employed in preparing the bonded materials of the invention include dimethyl methylenemalonate, diethyl methylenemalonate, di-n-propyl methylenemalonate, diisobutyl methylenemalonate, methyl ethyl methylenemalonate, di-n-butyl methylenemalonate, di-n-amyl methylenemalonate, di-2-ethylhexyl methylenemalonate, di-n-octyl methylenemalonate methyl n-octyl methylenemalonate and related esters of methylenemalonic acid.

While the subject esters of methylenemalonic acid have substantial stability in monomeric form when in bulk and rapidly polymerize when spread in a thin film, polymerization inhibitors and polymerization catalysts can be utilized in preparing the bonded articles of the invention if desired for certain applications. Generally, acidic materials inhibit polymerization. Acidic polymerization inhibitors can be utilized in small amounts (e.g. 0.0001 to 0.01% by weight based on the monomer) to stabilize the composition and minimize polymerization of the subject monomers in bulk form during storage. These include various acidic polymerization inhibitors such as sulfur dioxide, hydroquinone, hydrogen fluoride, boron trifluoride, nitric oxide, organic acids, organic anhydrides, stannic chloride, ferric chloride etc. Especially good results are obtained with the acidic gaseous inhibitors: sulfur dioxide, nitric oxide, boron trifluoride and hydrogen fluoride. Suitable polymerization catalysts or accelerators that can be applied to the surfaces of the elements being bonded include aliphatic alcohols such as methanol, isobutanol, capryl alcohol, etc.; and such basic materials as ammonia, dilute aqueous solution of sodium carbonate, piperidine, pyridine, tri(n-butyl)amine, di(2-ethylhexyl)amine, dimethylethanolamine, phenylethanolamine, tri(n-propyl)amine, N-(2-hydroxypropyl)morpholine, 1-methyl-4-(2-hydroxypropyl)piperazine, N - benzyl-N-ethyl-N-(2-phenylthanol)amine, diethylenetriamine, 1,4-bis-(2-hydroxyethyl)piperazine, poly(ethyleneimine) and the like.

The monomeric esters of methylenemalonic acid employed to form the bonding agent in the present invention can be modified with polymeric or resinous material to impart high viscosity thereto, and with plasticizers to improve the flexibility and aging characteristics of the bonds formed between various articles. Suitable viscosity modifiers or thickeners include various polymeric materials such as: polymeric α-cyanoacrylic acid esters, e.g., poly(methyl α-cyanoacrylate) and poly(isobutyl α-cyanoacrylate); polyacrylates, e.g., poly(methyl acrylate) and poly(ethyl acrylate); poly(methacrylates), e.g., poly(methyl methacrylate) and poly(ethyl methacrylate); cellulose esters, e.g., cellulose acetate, cellulose acetate butyrate, cellulose propionate, cellulose nitrate, etc. Suitable plasticizers include a wide range of known plasticizers such as dimethyl sebacate, dn-n-butyl sebacate, di-n-octyl phthalate, tricresyl phosphate, glyceryl triacetate, glyceryl tributyrate, diethyl sebacate, diisodecyl adipate and other plasticizer esters of the types disclosed in the patent to Joyner and Coover, U.S. 2,784,127.

We believe ourselves to be the first to discover that the monomeric esters of methylenemalonic acid can be used to form strong, rapid-setting adhesive bonds by polymerizing in situ on surfaces to be bonded. Also novel, to the best of our knowledge, are the adhesive compositions that we have developed as a result of the discovery of the use of the monomeric esters as adhesives. While the monomers can be used alone as adhesives, the novel adhesive compositions that provide the best results in accordance with the invention contain, in addition to the monomeric ester of methylenemalonic acid, at least one member selected from the group consisting of an acidic polymerization inhibitor, a polymeric thickener, and a plasticizer. The acidic stabilizer makes it possible to store the adhesive composition in bulk for longer periods than would otherwise be possible without causing polymerization of the monomer and consequent loss of adhesive activity. The polymeric thickener is added in amounts up to about 20 percent by weight of the monomer to provide a more viscous adhesive liquid. The plasticizer can also be added in amounts up to about 20 percent by weight, based on the monomer, to increase the flexibility of the polymerized adhesive bond. For rapid adhesive action the amount of plasticizer is about 1 to 5 percent by weight of the monomer. In this range the ester plasticizers increase flexibility of the adhesive bond without adversely affecting the adhesive qualities of the composition. A wide variety of materials can be adhered or bonded together in accordance with the invention. The procedure comprises spreading on at least one of the surfaces to be bonded a film of the liquid adhesive composition comprising a monomeric dialkyl ester of methylenemalonic acid, bringing together the surfaces to be bonded and polymerizing the film of monomer while in contact with such surfaces. The resulting product is a composite or laminated article in accordance with the invention comprising at least two elements bonded together by an adhesive layer formed by the polymerization in situ of the monomeric dialkyl ester of methylenemalonic acid.

Particularly useful articles of the invention are rigid laminates. Composite articles can be prepared by bonding together such materials as wood, steel, aluminum, brass, copper, glass, rubber, polyethylene, polypropylene, cellulose acetate butyrate, paper, leather, nylon fabric, polyester fabrics, cotton fabrics, and similar materials. In addition the monomers can be used in preparing bonds useful to the medical and dental arts, including uses in vascular surgery; bonding tissue, skin and bones; and bonding teeth to tissue and bones in the mouth. The polymeric bonds ultimately dissolve or dissipate in the human system after the tissues have healed.

The present invention is illustrated by the following examples of preferred embodiments thereof.

EXAMPLE 1

Preparation of diethyl methylenemalonate

A mixture of 0.78 mole (168.2 g.) of freshly distilled diethyl ethoxymethylenemalonate in 175 ml. of ethanol was reduced in a low-pressure hydrogenation apparatus using 4 g. of palladium on alumina catalyst and hydrogen at 45 p.s.i. gauge and at a temperature of 45° C. After 0.8 mole of hydrogen had been taken up in the reaction, the reduction was stopped and the catalyst was separated from the mixture by filtration using a filter aid. The ethanol solvent was distilled off under reduced pressure leaving a 160 g. residue of diethyl ethoxymethylmalonate. The diethyl ethoxymethylmalonate was then pyrolyzed in a 250 ml. 3-necked flask in the presence of 1.5 g. of phosphorus pentoxide. The flask was fitted with a magnetic stirrer and a thermometer and was attached to a six inch Hastelloy B packed column fitted with a still head and receiver. The flask charge was heated and 24.7 g. of ethanol was collected while the reaction mixture in the flask was raised from 135° C. to 180° C. The reaction mixture was cooled, 0.5 g. of hydroquinone was added, and the residue was distilled under reduced pressure to give 103.1 g. of monomeric diethyl methylenemalonate, B.P. 66–69° C. at 2.9 mm. The resulting product was again distilled and the product collected at 67.5–70° C. at 3 to 3.2 mm. and having $n_D^{20}$ 1.4314. The refractive index was taken on a refractometer whose prisms had been washed with acetic acid to remove basic substances and to inhibit polymerization. Care was taken to use a large drop of monomer and to separate the prisms as rapidly as possible after the reading had been obtained.

EXAMPLE 2

The highly purified diethyl methylenemalonate prepared as described in Example 1 polymerizes to form a firm bond in less than 10 seconds between two pieces of glass when spread therebetween in a thin monomeric film.

EXAMPLE 3

Dimethyl methylenemalonate, B.P. 53–59° C. at 6.8 mm., was used to prepare an adhesive composition. The adhesive composition consisted essentially of the dimethyl methylenemalonate (92 parts by weight), poly(methylmethacrylate) (5 parts by weight), and di-n-octyl phthalate (3 parts by weight). This adhesive composition was spread in a thin film between two pieces of steel and a steel-to-steel tensile bond having a strength of 2500 p.s.i. was formed.

EXAMPLE 4

Diethyl methylenemalonte, B.P. 67–70° C. at 3–3.2 mm., when spread in a thin film between two pieces of steel gave a steel-to-steel tensile bond strength of 1985 p.s.i.

EXAMPLE 5

An adhesive composition was prepared with di-n-butyl methylenemalonte, B.P. 88° C. at 0.5 mm. The adhesive composition consisted essentially of di-n-butyl methylenemalonate (90 parts by weight), poly₁methyl methacrylte) (7 parts by weight), and di-n-butyl sebacate (3 parts by weight). This adhesive composition was spread in a thin film between two pieces of steel and a steel-to-steel tensile bond having a bond strength of 1545 p.s.i. was formed.

EXAMPLE 6

Di - n - octyl methylenemalonate, B.P. 145–165° C. at .05–.15 mm., when spread in a thin film between two pieces of steel gave a steel-to-steel tensile bond strength of 500 p.s.i.

EXAMPLE 7

An adhesive composition was prepared with methyl n-octyl methylenemalonate, B.P. 105–115° C. at 0.75 mm. The adhesive composition consisted essentially of methyl n-octyl methylenemalonate (92 parts by weight), poly(methyl methacrylate) (5 parts by weight), and dimethyl sebacate (3 parts by weight). This adhesive composition was spread in a thin film between two pieces of steel and steel-to-steel tensile bond having a bond strength of 1235 p.s.i. was formed.

EXAMPLE 8

The diethyl methylenemalonate prepared as described in Example 1 forms strong bonds in various composite articles when spread in thin films between pieces of steel, maple wood, oak wood, aluminum, neoprene rubber, natural rubber, cellulose acetate butyrate resin, plastic grade polyethylene and polypropylene, human bone, human skin, nylon fabric and cotton fabric.

The following example illustrates the preferred method of preparing dimethyl methylenemalonate adhesive compositions of the invention containing sulfur dioxide as a stabilizer. The composition contains a small amount, e.g., about 0.0005 weight percent, of sulfur dioxide which is sufficient for stabilization, but contains no thickener or plasticizer.

EXAMPLE 9

(a)

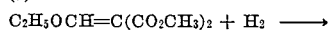

A mixture of 0.78 mole (147 g.) of dimethyl ethoxy methylene malonate dissolved in 175 ml. of absolute ethanol was reduced in a low pressure hydrogenation apparatus using 6.5 g. of palladium on alumina catalyst and hydrogen at 40 p.s.i. and 45° C. until 0.78 mole hydrogen was absorbed. Catalyst was removed from the reduction product by filtration using a filter aid to remove suspended catalyst particles. The ethanol was distilled off under reduced pressure to a final pot temperature of 110° C. to give a residue of 142.5 g.

(b)

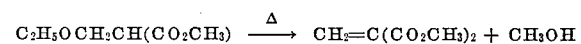

The above residue of 142.5 g. was placed in a 250 ml., three-necked flask to which was added 3.0 g. P₂O₅ and 1.5 g. hydroquinone. The flask was equipped with a magnetic stirrer and thermometer and was attached to a 6-inch packed column fitted with a still head and receiver. A total of 15.3 g. of liquid was collected during a heating interval of 40 min. as the pot temperature climbed from 133 to 193° C. The flask was cooled somewhat, a sulfur dioxide inlet tube was added to the pot and the mixture was distilled at low pressure in a stream of sulfur dioxide to give a fraction, B.P. 57–58 (2.6–2.9 mm.), weight 52 g. This fraction was redistilled to give a final product B.P. 59–63° C. (2.8 mm.). The products were collected in Dry Ice cooled receivers.

The next example illustrates the use of dimethyl methylenemalonate, prepared substantially according to Example 9 but containing no stabilizer, in the preparation of a variety of composite articles in accordance with the invention.

EXAMPLE 10

The adhesive activity of dimethylmethylenemalonate was determined on a number of substrates. This monomer gave a bond setting within 2 minutes between two pieces of stainless steel and between two pieces of glass within 5 seconds. A glass-aluminum bond formed within 1 minute. A bond having good resistance to a shearing force was obtained within 2 minutes using two ½" x 2" pieces of polyethyleneterephthalate film. The bond on polyethylene film was weak, but had set within 2 minutes. A bond was obtained within 1 minute between two rubber stoppers. Leather-leather and paper-paper bonds were prepared with the adhesive, but the porous nature of the materials bonded with the fluid adhesive allowed the adhesive to penetrate the substrate before polymerization. With a 0.25% aqueous sodium carbonate solution as catalyst, bonds were obtained on leather within 1 minute and on paper within 1 minute. Even without the use of this catalyst, a weak bond could be obtained between leather specimens within 2 minutes. Good bonds within 3 minutes were obtained between pieces of a laminated phenolic resin using the adhesive without catalyst.

The above example illustrates that the dialkyl methylenemalonates can be employed to form laminates of a wide range of solid materials. It further illustrates that the best results are obtained in bonding surfaces that are smooth and non-porous.

Although the invention has been described in detail with particular reference to certain preferred embodiments thereof, variations and modifications can be effected within the spirit and scope of the invention as described hereinabove and as defined in the appended claims.

We claim:

1. A substantially anhydrous moisture activated contact adhesive consisting essentially of a 2-methylenemalonate ester of the formula $CH_2=(COOR)_2$, in which R is an alkyl radical having 1–8 carbon atoms and an admixed substantially anhydrous and substantially non-volatile solvent for said ester, said solvent being compatible with and chemically non-reactive with said ester both hot and cold, being admixed in the proportion of about 1–20 parts for 100 parts of the ester, and serving as a plasticizer therefor.

2. The contact adhesive of claim 1, said solvent being selected from the group consisting of dibutyl phthalate, dioctyl phthalate, dimethyl sebacate, diethyl sebacate, diisodecyl adipate, dibutyl sebacate, tricresyl phosphate, glyceryl tributyrate and glyceryl triacetate.

3. An adhesive composition comprising (1) a monomeric compound of the formula $CH_2=C(CO_2R)_2$, wherein R is an alkyl radical having 1 to 8 carbon atoms, and (2) at least one member selected from the group consisting of (a) 0.001 to 0.01 percent, by weight based on the monomeric compound, of an acidic polymerization inhibitor;

(b) 1 to about 20 percent, by weight based on the monomeric compound, of a polymeric thickener; and (c) 1 to about 20 percent, by weight based on the monomeric compound, of a plasticizer.

4. An adhesive composition comprising (1) a highly pure monomeric compound of the formula $CH_2=(CO_2R)_2$, wherein R is an alkyl radical having 1 to 8 carbon atoms, and (2) 0.0001 to 0.01 percent, by weight based on the monomeric compound, of an acidic polymerization inhibitor selected from the group consisting of sulfur dioxide, hydroquinone, nitric oxide, boron trifluoride and hydrogen fluoride.

5. An adhesive composition comprising (1) a highly pure monomeric compound of the formula $CH=C(CO_2R)_2$, wherein R is an alkyl radical having 1 to 8 carbons, (2) 0.0001 to 0.01 percent, by weight based on the monomeric compound, of an acidic polymerization inhibitor selected from the group consisting of sulfur dioxide, hydroquinone, nitric oxide, boron trifluoride and hydrogen fluoride, and (3) at least one member selected from the group consisting of (a) 1 to about 20 percent, by weight based on the monomeric compound, of a polymeric thickener and (b) 1 to about 20 percent, by weight based on the monomeric compound of a plasticizer.

6. An adhesive composition comprising (1) a highly pure monomeric compound of the formula $CH_2=C(CO_2R)_2$, wherein R is an alkyl radical having 1 to 8 carbon atoms, (2) 0.0001 to 0.01 percent, by weight based on the monomeric compound, of an acidic polymerization inhibitor selected from the class consisting of sulfur dioxide, hydroquinone, nitric oxide, boron trifluoride, and hydrogen fluoride, and (3) at least one member selected from the group consisting of (a) 1 to 5 percent, by weight based on the monomeric compound, of a plasticizer ester and (b) 1 to 7 percent, by weight based on the monomeric compound, of a polymeric thickener.

7. An adhesive composition according to claim 6 wherein the plasticizer ester is dioctyl phthalate, dimethyl sebacate, diethyl sebacate or dibutyl sebacate and the polymeric thickener is poly(methyl acrylate), poly(ethyl acrylate), poly(methyl methacrylate) or poly(ethyl methacrylate).

8. An adhesive composition comprising (1) a highly pure monomeric compound of the formula $CH_2=C(CO_2R)_2$, wherein R is an alkyl radical having 1 to 8 carbon atoms, and (2) at least one member selected from the group consisting of (a) 1 to 5 percent, by weight based on the monomeric compound, of a plasticizer ester and (b) 1 to 7 percent, by weight based on the monomeric compound, of a polymeric thickener.

9. An adhesive composition according to claim 8 wherein the plasticizer ester is dioctyl phthalate, dimethyl sebacate, diethyl sebacate or dibutyl sebacate and the polymeric thickener is poly(methyl acrylate), poly(ethyl acrylate), poly(methyl methacrylate) or poly(ethyl methacrylate).

References Cited

UNITED STATES PATENTS 3,197,318  7/1965  Halpern et al. _____ 106—208

ALLAN LIEBERMAN, Primary Examiner

U.S. Cl. X.R.

260—31.2, 31.8, 485, 898, 901, 17.4

PO-1050
(5/69)

UNITED STATES PATENT OFFICE
CERTIFICATE OF CORRECTION

Patent No. __3,523,097__  Dated __August 4, 1970__

Inventor(s) __Harry W. Coover, Jr. and Newton H. Shearer, Jr.__

It is certified that error appears in the above-identified patent and that said Letters Patent are hereby corrected as shown below:

Column 2, lines 5-6, the formula should read
--- $CH_3CH_2OCH_2CH(\overset{O}{\overset{\|}{C}}-OR)_2$ ---.

Column 3, line 11, delete "(2-phenylthanol)amine" and insert in lieu thereof ---(2-phenylethanol)amine---.

Column 3, line 28, delete "dn-n-butyl" and insert in lieu thereof ---di-n-butyl---.

Column 3, line 52, delete "viscouse" and insert in lieu thereof ---viscous---.

Column 4, line 64, Example 4, delete "methylenemalonte" and insert in lieu thereof ---methylenemalonate---.

Column 4, line 72, Example 5, delete "methylenemalonte" and insert in lieu thereof ---methylenemalonate---.

Column 4, line 73, Example 5, delete "poly$_1$methyl methacrylte" and insert in lieu thereof ---poly(methyl methacrylate)---.

Column 6, line 34, Claim 1, delete "$CH_2=(COOR)_2$" and insert in lieu thereof ---$CH_2=C(COOR)_2$---.

Column 6, line 52, Claim 3, delete "0.001" and insert in lieu thereof ---0.0001---.

Column 6, line 60, Claim 4, delete "$CH_2=(CO_2R)_2$" and insert in lieu thereof ---$CH_2=C(CO_2R)_2$---.

Column 6, line 68, Claim 5, delete "$CH=C(CO_2R)_2$" and insert in lieu thereof ---$CH_2=C(CO_2R)_2$---.

Column 6, line 69, Claim 5, delete "carbons" and insert in lieu thereof ---carbon atoms---.

Signed and sealed this 13th day of July 1971.

(SEAL)
Attest:

EDWARD M. FLETCHER, JR.
Attesting Officer

WILLIAM E. SCHUYLER, JR.
Commissioner of Patents